Patented May 27, 1952

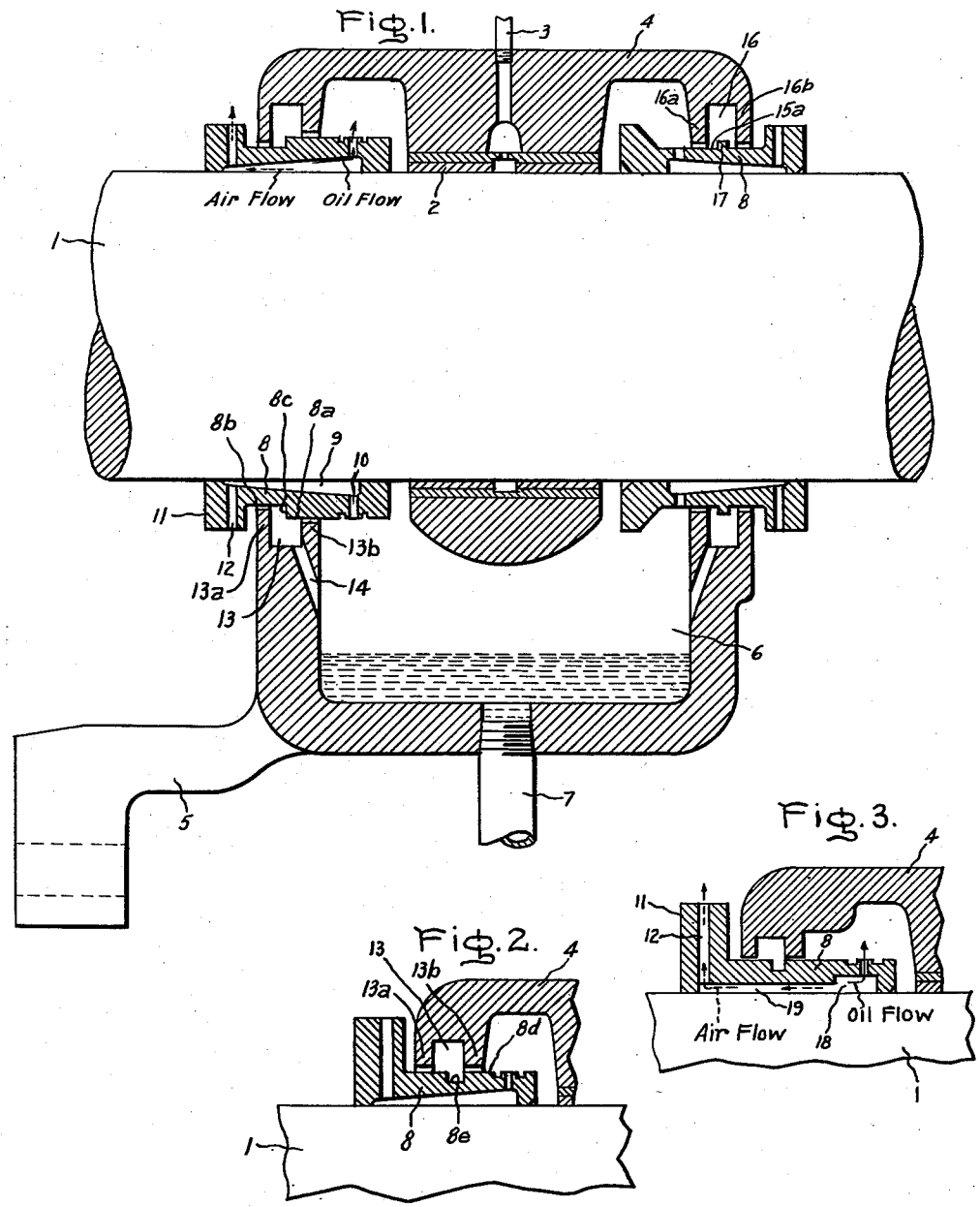

2,598,381

UNITED STATES PATENT OFFICE 2,598,381

VENTED SHAFT SEAL

Herbert N. Hoffman, Wakefield, Mass., assignor to General Electric Company, a corporation of New York Application July 6, 1949, Serial No. 103,208

8 Claims. (Cl. 286—9)

This invention relates to sealing arrangements for rotating shafts supported in bearings disposed in substantially sealed housings. While not limited thereto, the invention has particular utility in connection with preventing oil leakage from the shaft bearings of high speed prime movers such as steam turbines.

In the case of a machine having a high speed shaft carried in bearings disposed in substantially sealed bearing housings, it is frequently found that rotation of the shaft and associated members results in a building up of pressure inside the bearing housing, which has a tendency to force oil out through the shaft seals. This problem has been particularly troublesome in connection with small high speed turbines running at speeds up to 10,000 R. P. M. An important part of the solution to this oil leakage lies in providing a vent to relieve the internal pressure which would otherwise build up inside the bearing housing. However, providing a suitable vent, arranged so that oil or oil vapor will not escape therefrom, usually proves to be a very difficult problem.

Accordingly, it is an object of the present invention to provide a shaft seal structure which incorporates an unusually effective venting arrangement for the interior of the bearing housing, and at the same time positively resists the leakage of oil along the shaft from the bearing housing.

More specifically, the purpose of the invention is to provide a shaft seal arrangement which performs the following functions:

1. Effects positive venting of the bearing housing at the place where venting is needed most, namely immediately adjacent the shaft and communicating with the space adjacent the inside wall of the casing.

2. Produces a centrifuging action on any oil-air vapor mixture which tries to leave the bearing housing, so that the oil particles are separated from the air.

3. Produces a positive pumping action on the air, forcing it to the exterior of the bearing housing.

4. Produces a positive pumping action on the oil, forcing it back into the bearing housing.

With the present invention, all these functions are performed simultaneously by extremely simple structural means requiring no substantial increase in dimensions of the bearing housing, either in an axial or radial direction.

Other objects and advantages will be apparent from the following description taken in connection with the accompanying drawings, in which Fig. 1 is a sectional view of a sealed bearing housing structure employing two different forms of the invention at the respective ends of the housing; Fig. 2 is a detail sectional view showing a third modification; and Fig. 3 is a sectional view of a still further modification.

Referring now more specifically to Fig. 1, the rotating shaft 1 is supported in a plain journal bearing 2, which may be of any suitable type. It will be obvious that the invention is equally applicable to arrangements employing various types of anti-friction bearings. The details of the bearing employed are not material to an understanding of the present invention and therefore are not described further here. It may be noted however, that lubricating oil is supplied by a suitable conduit 3 to the rubbing surfaces of the bearing 2 through passages provided in the housing 4. Although not shown clearly in the drawings, it will be understood by those skilled in the art that, in order to facilitate assembly, the housing 4 is actually split on a horizontal plane through the center line of shaft 1, the two halves being secured together by any suitable fastening devices. The bearing housing 4 is supported in any suitable manner, for instance by a bracket 5 secured to the casing of a machine.

The lower half of housing 4 forms a sump 6 in which collects the spent oil from bearing 2, and from which this oil is returned to the lubrication system, as by means of a drain conduit 7. It will of course be appreciated that the invention is also applicable to bearings of the type in which oiling rings or equivalent devices are carried on the shaft and have a portion dipping into the oil in reservoir 6, so that the rotation of the shaft causes the oil to be carried up onto the top of the shaft, instead of being supplied under pressure through the conduit 3.

Surrounding the shaft 1 at either end of the bearing housing 4 are the venting and sealing devices which are the subject of the present invention. The sealing structure at the left-hand end of the bearing housing comprises a cylindrical sealing member 8 which is shrunk, pressed, or otherwise firmly secured to the shaft 1 so that there is no fluid leakage path between the member 8 and the shaft 1. The member 8 is provided with an annular recess 9 the outer wall of which tapers, with its major diameter at the right-hand end and located within the bearing housing, while the exterior end is of substantially smaller diameter and located exterior of the bearing housing. The interior end of the sealing member 8 is provided with a plurality of radially extending circumferentially spaced holes 10. It will be obvious from a consideration of the drawing that these passages 10 communicate directly with the space inside the bearing housing immediately adjacent the interior wall of the housing. At the exterior side of the bearing housing, the end portion of sealing cylinder 8 is provided with a radially extending flange 11 having a plurality of circumferentially spaced radially extending holes 12.

It is to be noted particularly that the annular chamber 9 is of a rather substantial axial length and of sufficient volume to form a centrifuge chamber in which the oil and air mixture from the interior of the bearing housing is caused to whirl at shaft speed. It will also be observed that the surface of the tapered chamber 9 experiences a gradual change in diameter without any discontinuities in the smooth taper from the small diameter to the larger. Also the passages 12 are substantially longer in radial direction than the passages 10, that is, they discharge at a substantially greater radius from the center of the shaft than the inlets to the passages 10. Although it cannot be readily ascertained from the drawing, it is to be noted that the passages 10 are of such a cross-section size and number as to provide an aggregate flow path of substantially greater area than that provided by the passages 12. For instance, the holes 10, 12 may be of the same diameter, but there may be eight of the holes 10, while there are a smaller number, for instance six of the holes 12. The reason for these design features will be seen from the following description of the method of operation.

In operation, the sealing cylinder member 8 rotates with the shaft 1 and any pressure which tends to build up within the bearing housing 4 causes a flow of air and entrained oil particles radially inward through the passages 10 and into the annular centrifuge chamber 9. It will be obvious that in the process of passing inwardly through the radial passages 10, the air-oil mixture is given a rotational velocity equal or substantially equal to that of the cylinder member 8. Thus the fluid within the chamber 9 is caused to whirl with a velocity equal or substantially equal to that of the shaft and cylinder 8. The resulting centrifugal effect on the oil-air mixture causes the heavier oil particles to coalesce and be thrown outwardly so as to strike the tapering outer surface of chamber 9. The air, of course, remains free to flow to the left through the space 9 and out the radial pumping passages 12. Due to the fact that passages 12 discharge at a materially greater radius than the intake to the passages 10, there is a positive net centrifugal pumping action tending to induce a flow of air from the inside of the bearing housing out through the passages 10, 9, 12 as indicated by the air flow arrows in Fig. 1. On the other hand, the heavier oil particles are thrown against the tapering inner surface of the chamber 9, after which the continuing effect of centrifugal force makes the oil particles flow along the outwardly tapering surface to the right until they are discharged back through the passages 10 to the interior of the bearing housing.

The reason for making the aggregate effective area of the passages 10 substantially larger than that of the passages 12 is so the oil can flow back into the bearing housing through the same set of passages which leads the air-oil mixture from the bearing housing into the centrifuge chamber 9. Since the passages 12 handle only air, they may be of smaller effective area.

The further modification shown in Fig. 3 is identical to that in Fig. 2, except that the bore of the sealing member 8 is not tapered but has a large diameter centrifuge chamber 18, the central part of which communicates with a comparatively small annular passage 19, as will be obvious from Fig. 3. With this arrangement, a strong vortex whirl is produced in the centrifuge chamber 18 effecting substantially complete separation of oil from air. The oil is of course pumped back into the housing through the radial passages 10. The comparatively pure air at the core of the vortex in chamber 18 is pumped out through the passage 19. It will of course be understood that the centrifuge chamber 18 is of sufficient axial length that the oil will have been quite thoroughly separated from the air before the mixture gets as far as the entrance to the passage 19.

The arrangement of Fig. 3 has been found to be not quite as effective as that of Figs. 1 and 2 where the centrifuge chamber is of considerably greater axial length and the tapered surface of the bore more positively insures that oil will be returned to the inner set of holes 10. However, the arrangement of Fig. 3 may be found somewhat easier to manufacture, and gives acceptable results, at least in some applications.

It will be seen from the above that the invention provides not just a "passive" vent arrangement for permitting high pressure fluid inside the bearing housing to escape to atmosphere, but on the other hand effects a "dynamic venting" in which air inside the housing is positively pumped to the exterior so that the pressure inside the bearing housing may be somewhat below that of the surrounding atmosphere. This of course effectively resists the tendency of the oil or oil vapor in the housing to leak outwardly through the shaft seals. In addition to this very important venting function, the invention effects a strong centrifuging action tending to separate the entrained oil from the air which is pumped out of the bearing housing. And finally, the centrifuged oil is positively pumped by centrifugal force back into the housing.

It will therefore be seen that, by very simple structural means, an arrangement is provided which vents the housing, or even reduces the interior pressure below that of the surrounding atmosphere, separates oil from the air vented from the housing, and positively pumps the air out of the housing and the oil back in.

Use of the invention on high speed machines such as small steam turbines operating in the neighborhood of 10,000 R. P. M. has shown that the arrangement is extremely effective in reducing or completely eliminating the problem of oil leakage.

The above description of the features to which this invention particularly relates has not included the oil sealing arrangement provided between the walls of the housing and the outer surface of the sealing cylinder 8. It will of course be obvious that there is necessarily some slight clearance between the outer surface of cylinder 8 and the circular opening in the housing 4. As shown at the left side of Fig. 1, the wall of housing 4 is provided with an annular recess 13 concentric with the shaft and forming annular lands 13a, 13b, of which form close clearances with the outer surface of cylinder 8. The lower portion of groove 13 communicates by way of a passage 14 with the oil sump 6. It will be apparent that any oil leaking through the clearance with land 13b will collect in the recess 13 and be drained back into the sump 6 by way of the passage 14.

It will also be observed that the land 13b has a circumferential surface somewhat larger in diameter than the land 13a. The former forms a close clearance with a cylindrical surface 8a of the sealing cylinder 8, while the latter forms a close clearance with a second cylindrical surface 8b. The cylindrical surfaces 8a, 8b are joined by a narrow, radially extending annular surface 8c. Centrifugal force will make it very difficult for any oil particles to progress from the larger radius of the clearance space between 8a, 13b to the smaller radius of the clearance space between 8b, 13a. Furthermore, the radially extending surface 8c will serve as an "oil slinger" tending to throw into the recess 13 any oil particles which may contact the surface 8b. It will of course be apparent that the surface 8b might be made with a slight taper, roughly parallel to the taper of the outer surface of chamber 9 so that any oil contacting the surface 8b would tend to progress by centrifugal force to the right until it was thrown off by the slinger surface 8c.

It is to be understood that the sealing arrangement provided between the external surface of the sealing member 8 and the adjacent wall of the housing 4 may be of any suitable type. An alternate form is shown at the right-hand side of Fig. 1. Here the sealing cylinder member 8 is identical to that shown at the left-hand side of Fig. 1, except that the external surface is shaped to provide a somewhat different sealing arrangement with the housing. Here the housing forms axially spaced circumferential lands 16a, 16b, which form close radial clearances with the outer cylindrical surface 15a of the sealing cylinder member 8. The surface 15a is interrupted by a circumferential ridge 17 which serves as an oil slinger to prevent oil particles from progressing along the surface 15a to the right. It will be obvious that the slinger 17 causes oil particles to be thrown into the drain recess 16 instead of progressing further to the right through the clearance between 16b, 15a.

Fig. 2 shows a still further modification of the oil seal between the sealing cylinder member 8 and the annular lands 13a, 13b. It will be seen that here again the sealing cylinder member 8 is identical with that shown at the left-hand side of Fig. 1, except for the configuration of the outer surface. The outer cylindrical surface 8d is provided with a circumferential groove 8e, the radially extending sidewalls of which serve as slingers to throw off oil particles into the collecting chamber 13, instead of permitting them to travel through the clearance with land 13a.

All these sealing arrangements described for preventing leakage of oil around the outside of the sealing cylinder 8 are perfectly feasible, although that shown at the left-hand side of Fig. 1 has been found to be most effective, that at the right-hand side of Fig. 1 next best, while that shown in Fig. 2 is the least effective of the three illustrated. It should be noted however that a great many other types of shaft seal, for instance many types of known rubbing shaft seal devices may be employed.

The invention has another advantage when used as shown in the drawing, as follows. It will be noted that the radial clearances between the casing lands 13a, 13b and the cylindrical surfaces 8b, 8a (and the corresponding clearances in the other modifications illustrated) have been somewhat exaggerated in the drawings for purposes of clearer illustration. Actually the clearances are made as small as manufacturing convenience will permit. Leakage of oil outward through these clearances is resisted by the stream of atmospheric air flowing inwardly, this air flow being induced by the sub-ambient pressure developed inside the housing as described above. Thus the special sealing member 8 serves indirectly to prevent oil leakage around the outside of it, as well as through it.

It will be obvious that many changes and modifications in various mechanical details may be made, and I intend to cover by the appended claims all such modifications as fall within the true spirit and scope of the invention.

What I claim as new and desire to secure by Letters Patent of the United States is:

1. In a venting arrangement for a substantially sealed housing having a liquid inside with a high speed shaft projecting through a wall thereof, the combination of a substantially cylindrical sealing member on the shaft, said sealing member and shaft defining an axially extending centrifuge chamber of annular cross-section coaxial with the shaft and smoothly tapering from a smaller diameter at the exterior side of the sealed housing to a larger diameter adjacent the inner surface of the housing wall, the interior end of the sealing member defining first radially extending passages communicating with the major diameter of the centrifuge chamber, the exterior end of the sealing member defining second radially extending passages communicating with the minor diameter of the chamber and discharging into the ambient atmosphere at a substantially greater radius than the inlet to said first passages from the interior of the housing, and sealing means for preventing leakage of fluid between the housing wall and the surface of said sealing member intermediate said first and second passages, whereby centrifugal force causes liquid particles in the centrifuge chamber to be thrown onto said tapered surface and returned into the housing through the first-mentioned passages while gases in the centrifuge chamber are positively pumped out through the second-mentioned passages to induce a flow of fluids through said first passages into the centrifuge chamber and thereby reduce the pressure inside the sealed housing.

2. In a vented fluid seal assembly for a high-speed rotor having a portion disposed through an opening in a wall of a substantially sealed housing, the combination of rotor portions located adjacent the opening in the housing wall and having an interior centrifuge chamber with an outer wall of circular cross-section coaxial with the rotor and smoothly tapering axially from a minor diameter adjacent the exterior side of the sealed housing to a major diameter adjacent the interior side of the housing, said rotor defining a first set of radially extending passages communicating with the major diameter of the centrifuge chamber and with the space inside the sealed housing, said rotor also defining a second set of radially extending passages communicating with the minor diameter of the centrifuge chamber and discharging exteriorly of the sealed housing, the discharge ends of said second set of passages being at a substantially greater radius than the inlets to said first set of passages, and means for preventing leakage of fluid from inside the housing through the clearance space between the outer surface of the rotor and the adjacent surfaces of the housing, whereby centrifugal force causes liquid particles in the centrifuge chamber to be thrown outwardly onto the tapered wall thereof and pumped back into the housing through said first-mentioned set of passages while gaseous components of the mixture in the centrifuge chamber are positively pumped out through the second-mentioned set of passages to reduce the pressure inside the sealed housing.

3. In a vented liquid seal assembly for a rotary shaft disposed through a wall of a substantially sealed housing, the combination of a cylindrical sealing member on the shaft and defining an axially extending tapered annular chamber surrounding the shaft with a major diameter at the interior side nearer the bearing and a minor diameter towards the exterior of the bearing housing, the interior end of said member defining first radially extending passages communicating with the major diameter of said chamber and the exterior end of said member defining second radially extending passages communicating with the minor diameter of said chamber, and sealing means for preventing leakage of fluid through the clearance space between the housing and exterior surface of said seal member intermediate said first and second radial passages, whereby gases inside the housing are vented to atmosphere through the second passages while liquid particles are centrifugally separated from the gases and returned to the housing through the first radial passages.

4. A vented shaft seal member comprising a cylindrical body with a central bore including first and second axially spaced end bore portions adapted to engage a shaft in fluid sealing relation therewith and an intermediate bore portion with a smoothly tapered wall extending axially from a minor diameter adjacent the first end bore portion to a major diameter adjacent the second end bore portion, the first end portion of the member defining a plurality of radially extending passages communicating with said intermediate bore portion at its minor diameter, said second end portion defining a second set of radially extending passages communicating with said intermediate bore portion at its major diameter, the outer surface of said member intermediate the first and second sets of radial passages being shaped to form at least one radially extending liquid slinger surface for resisting the passage of liquid axially along the outer surface of the member, the radially outer portions of the first set of passages being at a substantially greater radius from the center of rotation than the radially outer portions of the second set of passages, whereby high speed rotation of the sealing member with an associated shaft will effect a positive centrifugal pumping action tending to draw fluid radially inward through the second set of passages, liquid and gaseous components being centrifugally separated in said intermediate bore portion, with the gaseous components being pumped out through the first set of passages while liquid components travel axially along the surface of the tapered bore portion and are expelled radially outward through the second set of passages.

5. In a venting arrangement for a substantially sealed housing having a liquid inside and a high speed shaft projecting through a wall thereof, the combination of a substantially cylindrical sealing member on the shaft, the sealing member and shaft cooperating to define an axially extending centrifuge chamber of annular cross-section coaxial with the shaft and including a larger diameter portion at the end of the sealing member adjacent the interior of the housing and adapted to form a liquid separating chamber and a second smaller diameter portion communicating with the liquid separating chamber and extending axially towards the exterior side of the sealing member, the interior end of the sealing member defining first radially extending passages communicating with the outer circumferential portion of said liquid separating chamber and the space within the housing, the exterior end of the sealing member defining second radially extending passages communicating with the adjacent end of said small diameter portion and discharging into the ambient atmosphere at a substantially greater radius than the radially outer portion of said first passage, and means for preventing leakage of fluid between the housing wall and the outer circumferential surface of the sealing member intermediate the first and second passages, whereby centrifugal force causes liquid particles in the liquid separating chamber to be thrown outwardly onto the circumferential walls of the chamber and returned to the housing through the first-mentioned passages, while gases at the central portion of the centrifuge chamber are drawn off through the smaller diameter chamber portion and positively pumped out through the second-mentioned passages to reduce the pressure inside the sealed housing.

6. In a vented fluid seal assembly for a high speed rotor having a portion disposed through an opening in a wall of a substantially sealed housing, the combination of rotor portions located adjacent the opening in the housing wall and forming an interior centrifuge chamber with an outer wall of circular cross-section coaxial with the shaft and communicating with a smaller diameter coaxial wall forming an axially extending passage, the rotor having a first set of radially extending passages communicating with the outer portion of said centrifuge chamber and with the space inside the sealed housing, the rotor also defining a second set of radially extending passages communicating with the smaller diameter axial passage and discharging to the exterior of the sealed housing, the discharge ends of said second set of passages being at a substantially greater radius than the radially outer portions of said first set of passages, and means for resisting leakage of fluid from inside the housing through the clearance space between the outer circumferential surface of the rotor and the adjacent portions of the housing, whereby centrifugal force causes liquid particles in the centrifuge chamber to be thrown outwardly and pumped back into the housing through the first-mentioned set of passages while gaseous components of the mixture in the centrifuge chamber are drawn off through the axially extending passage and positively pumped out through the second set of passages to reduce the pressure inside the sealed housing and thereby reduce the tendency of fluids inside the housing to leak outwardly through said leakage resisting means.

7. A vented fluid seal assembly in accordance with claim 6 in which the outer wall of the centrifuge chamber is of substantially constant diameter and the outer wall of the axially extending passage for the discharge of gases is likewise of a diameter which is constant but substantially smaller than that of the centrifuge chamber, the cylindrical surfaces of the centrifuge chamber and axial passage being connected by a substantially radially extending annular surface which resists the entry of liquid particles into the axial passage.

8. In a vented fluid seal assembly for a high speed rotor having a portion disposed through an opening in a wall with a gaseous medium at one side thereof and gases and liquids at the other side thereof, the combination of rotor portions located adjacent the opening in the wall and defining an interior centrifuge chamber the outer wall of which is of circular cross section coaxial with the rotor and communicating with a smaller diameter cylindrical wall portion forming an axially extending passage, the rotor having a first set of radially extending passages communicating with the outer portion of said centrifuge chamber and with the space at the side of the wall containing both liquid and gaseous medium, the rotor also defining a second set of radially extending passages communicating with the smaller diameter axial passage at a location spaced from the centrifuge chamber and discharging at the opposite side of said wall, the discharge ends of said second set of passages being at a substantially greater radius than the radially outer portions of said first set of passages, and means for resisting leakage of fluids from one side of the wall to the other through the clearance space formed between the outer circumferential surface of the rotor and the surrounding portions of the wall, whereby centrifugal force causes liquid particles in the centrifuge chamber to be thrown outwardly and pumped through said first set of passages while gaseous components of the mixture in the centrifuge chamber are drawn off through said axially extending passage and pumped out through the second set of passages.

HERBERT N. HOFFMAN.

REFERENCES CITED

The following references are of record in the file of this patent:

UNITED STATES PATENTS

| Number | Name | Date |
| --- | --- | --- |
| 521,836 | Walker | June 26, 1894 |
| 887,831 | Muth | May 19, 1908 |
| 988,138 | Penny et al. | Mar. 28, 1911 |